2,937,982

METHOD OF MAKING UO₂-BI SLURRIES

Harold T. Hahn, Richland, Wash., assignor to the United States of America as represented by the United States Atomic Energy Commission No Drawing. Filed Apr. 8, 1958, Ser. No. 727,231

5 Claims. (Cl. 204—154.2)

This invention relates to a method of preparing a stable suspension of uranium dioxide in bismuth. In more detail the invention relates to a method of preparing a fuel for a nuclear reactor comprising a relatively stable suspension of uranium dioxide in bismuth.

A reactor which might employ as fuel a suspension of uranium dioxide in bismuth has been designed at the Brookhaven National Laboratory and has been described in the reports of that organization under the designation of the Liquid Metals Fueled Reactor (LMFR). One difficulty that exists in the preparation of the fuel for such a reactor arises from the fact that uranium dioxide is not wet by bismuth at temperatures below 1240° C. The uranium dioxide particles tend to agglomerate when they are not wet by the bismuth and can only be dispersed in the bismuth by violent agitation. Therefore, a uniform, easily dispersible suspension cannot be obtained unless conditions are such that the uranium dioxide is wet by the bismuth. One procedure for accomplishing this is to employ high temperatures. Another procedure is to add a reactive metal such as magnesium to the mixture of uranium dioxide and bismuth. The additive takes up excess oxygen in the mixture thereby making it readily dispersible. The additive, however, introduces a slag into the system thereby contaminating the system.

It is accordingly an object of my invention to develop a new method of preparing an easily dispersed, stable suspension of uranium dioxide in bismuth.

It is another object of the present invention to develop a new method of preparing a nuclear reactor fuel comprising an easily dispersible suspension of uranium dioxide in bismuth.

I have found that an easily dispersible suspension of uranium dioxide in bismuth can be prepared by heating and agitating a mixture of bismuth oxide, bismuth, and uranium, the amount of bismuth oxide employed being somewhat less than that theoretically required to oxidize the uranium to uranium dioxide.

The amount of bismuth oxide employed is less than that theoretically required according to the equation $U + \frac{2}{3}Bi_2O_3 \rightarrow \frac{4}{3}Bi + UO_2$ because oxygen available in the free space of the capsule in which the reaction is carried out is also available for the reaction and because some of the uranium becomes unavailable because it reacts with the material of the capsule. An excess of available oxygen results in the formation of $UO_{2+}$ which is not wetted by bismuth and therefore is not easily dispersed in bismuth. Therefore an important feature of this invention is to start with a mixture of uranium and bismuth and oxidize the uranium with just sufficient bismuth oxide to form uranium dioxide, having no more than two atoms of oxygen per atom of uranium.

It is well known that uranium dioxide picks up oxygen from the atmosphere to form $UO_{2+}$ (a so-called nonstoichiometric compound). This form of uranium dioxide is not readily dispersible. Similarly, as discussed above, uranium dioxide formed in situ with an excess of oxygen available is not readily dispersible. It is only when the reaction is carried out under such conditions that the $UO_2$ produced does not contain excess oxygen that the slurry is easily dispersible.

The reactants are heated to a temperature equal to or greater than the melting point of the metal oxide, or to that temperature at which uranium has a finite solubility in bismuth whichever is higher. If it is desired to produce the slurry rapidly, a period of heating above the melting point of uranium may be included. Under these conditions the reactants are all in a liquid condition. However, the slurry can be produced at a lower temperature in a somewhat longer time.

A specific example will next be described. 35.6 grams of bismuth oxide were heated and agitated together with 218 grams of bismuth and 33.1 grams of uranium in a sealed steel capsule. The amount of bismuth oxide employed was just sufficient to provide an oxygen-uranium ratio of 1.67 to 1 while the uranium was present as 11.5 weight percent of the total. The capsule employed was one inch in diameter by five inches long. The sealed capsule was heated according to a somewhat longer and more involved heating schedule than that required, as follows:

16 hours 850° C., muffle furnace, mechanical shaking.
½ hour 850–900° C., inductive heating, manual shaking.
16 hours 700–900° C., muffle furnace, no agitation.
1 hour 1200° C., inductive heating, manual shaking.
5 minutes 950° C., inductive heating, manual shaking.

The sample was then cooled for at least 15 minutes and decapsulated. X-ray diffraction and visual inspection showed that a metallic appearing casting was obtained without slag and with no unreacted bismuth oxide or uranium present. Chemical analysis of five segments of the casting in descending order were 12.2, 12.5, 11.3, 11.2, and 10.6 weight percent uranium, the weighted average being 11.6 weight percent. Microscopic examination under polarized light corroborated the uniformity of dispersion and the presence of uranium dioxide.

After remelting the casting under pressures of $10^{-4}$ mm. Hg, observation showed that the slurry was fluid and the oxide easily redispersed.

In other experiments a practical heating schedule has been established as follows:

1 hour, 875–925° C.
1 hour, 1000–1050° C.
1 hour, 1100–1150° C.

A period of heating above 1135° C., the melting point of uranium, has been included so that the slurry may be produced rapidly. If time is not important, lower temperatures may be used providing these temperatures are above 850° C., the melting point of bismuth oxide.

Some of these experiments were carried out at lower uranium concentrations. In no case was any free oxide observed when the original oxygen/uranium ratio was 1.67. In no experiment in which the initial oxygen/uranium ratio was 1.95 has the product been free of unwetted and segregated oxide. This is due both to oxygen present in the free space of the capsule and to uranium which has become unavailable due to reaction with the capsule.

A slurry containing 20 weight percent uranium and fluid at 600° C. has been prepared in similar manner. The upper limit of uranium concentration has not been established with respect to fluidity, but it is believed to be approximately 25 percent.

The slurry may also be used as a radiation source in the system disclosed by J. S. Levinger et al. in Patent No. 2,781,309. In this system delayed neutrons resulting from the fission process are available as a source of radiation.

What is claimed is:

1. A method of preparing an easily dispersible slurry of uranium dioxide in bismuth comprising heating a mixture of bismuth oxide, uranium and bismuth in a sealed capsule to a temperature over the melting point of the bismuth oxide wherein the relative proportions of bismuth oxide and uranium are such that the bismuth oxide coupled with the oxygen contained in the capsule is just sufficient to oxidize all of the uranium which has not reacted with the capsule walls to uranium dioxide containing not over two atoms of oxygen to one of uranium.

2. A method according to claim 1 wherein the bismuth oxide is added in such an amount as to provide an oxygen to uranium ratio of 1.67 to 1, considering only the oxygen of the bismuth oxide.

3. A method according to claim 2 wherein the capsule is of steel and is one inch in diameter by five inches long.

4. A method according to claim 3 wherein the uranium constitutes 11.5 weight percent of the mixture.

5. A method according to claim 4 wherein the mixture is heated to a temperature above the melting point of uranium for a part of the heating cycle.

References Cited in the file of this patent

UNITED STATES PATENTS 2,883,330    Teitel _____ Apr. 21, 1959

OTHER REFERENCES

KAPL–1877, July 1, 1957. Available from OTS, Dept. of Comm., Washington 25, D.C. Price 75¢.